United States Patent
Berns (10) Patent No.: US 8,974,625 B2
(45) Date of Patent: Mar. 10, 2015

(54) METHOD FOR BONDING SUPPLEMENTAL MATERIAL TO TEXTILES

(75) Inventor: Jason Berns, Baltimore, MD (US)

(73) Assignee: Under Armour, Inc., Baltimore, MA (US)

( * ) Notice: Subject to any disclaimer, the term of this patent is extended or adjusted under 35 U.S.C. 154(b) by 871 days.

(21) Appl. No.: 12/569,526

(22) Filed: Sep. 29, 2009

(65) Prior Publication Data

US 2011/0072558 A1     Mar. 31, 2011

(51) Int. Cl.
| | | |
|---|---|---|
| *B32B 7/14* | (2006.01) | |
| *B32B 7/04* | (2006.01) | |
| *B32B 7/10* | (2006.01) | |
| *B32B 37/26* | (2006.01) | |
| *B32B 38/14* | (2006.01) | |
| *A41H 43/04* | (2006.01) | |
| *A41D 27/24* | (2006.01) | |
| *A43B 3/00* | (2006.01) | |
| *B29C 65/52* | (2006.01) | |
| *B29C 65/00* | (2006.01) | |

(Continued)

(52) U.S. Cl.
CPC ............. *A41H 43/04* (2013.01); *A41D 27/245* (2013.01); *A43B 3/0084* (2013.01); *B29C 65/526* (2013.01); *B29C 66/4724* (2013.01); *B29C 66/729* (2013.01); *B29C 65/18* (2013.01); *B29C 66/1122* (2013.01); *B29C 65/4815* (2013.01); *B29L 2031/48* (2013.01); *B41M 3/006* (2013.01); *B29C 65/4845* (2013.01); *B29C 66/8322* (2013.01)
USPC ............ 156/291; 156/241; 156/277; 156/289

(58) Field of Classification Search
USPC .......................... 156/277, 241, 291, 295, 289
See application file for complete search history.

(56) References Cited

U.S. PATENT DOCUMENTS

| 3,537,194 A | 11/1970 | Engle | |
|---|---|---|---|
| 3,720,562 A * | 3/1973 | Drelich | .......................... 156/291 |

(Continued)

FOREIGN PATENT DOCUMENTS

| JP | 60-013871 | 1/1985 |
|---|---|---|
| JP | 04-068100 | 3/1992 |
| JP | 2011-68130 | 4/2011 |

OTHER PUBLICATIONS

English translation of JP-04-068100, Mar. 3, 1992.*

(Continued)

*Primary Examiner* — Sonya Mazumdar
(74) *Attorney, Agent, or Firm* — Maginot, Moore & Beck LLP (57) ABSTRACT

A method for bonding supplemental materials of various shapes to a base textile comprises printing an adhesive material, such as a thermoplastic ink, onto a backing sheet, such as a paper backing. The thermoplastic ink may be printed onto the paper backing using a print head, silk screen, gravure, or any other appropriate printing device capable of printing the ink onto the backing sheet in a desired shape and with a desired thickness. The adhesive material is generally printed in substantially the same shape as the perimeter of the supplemental material to be bonded to the base textile. After the thermoplastic ink is printed onto the backing sheet, the thermoplastic ink is transferred to the base fabric using a bonding process. The backing sheet is then peeled away, and the supplemental material is then bonded to the exposed adhesive material on the base fabric using a subsequent bonding process.

8 Claims, 7 Drawing Sheets (51) Int. Cl.
    *B29C 65/18*     (2006.01)
    *B29C 65/48*     (2006.01)
    *B32B 38/06*     (2006.01)
    *B29L 31/48*     (2006.01)
    *B41M 3/00*     (2006.01)

(56) References Cited

U.S. PATENT DOCUMENTS

| | | | | | |
|---|---|---|---|---|---|
| 3,765,997 | A | * | 10/1973 | Dunning | 428/172 |
| 3,920,499 | A | * | 11/1975 | Day et al. | 156/240 |
| 4,089,722 | A | * | 5/1978 | Holoubek | 156/235 |
| 4,139,613 | A | * | 2/1979 | Hefele | 427/197 |
| 4,157,272 | A | * | 6/1979 | Kuroda | 156/219 |
| 4,294,641 | A | * | 10/1981 | Reed et al. | 156/234 |
| 4,315,790 | A | * | 2/1982 | Rattee et al. | 156/230 |
| 4,401,494 | A | * | 8/1983 | Pernicano et al. | 156/155 |
| 4,451,315 | A | * | 5/1984 | Miyazaki | 156/220 |
| 4,544,590 | A | * | 10/1985 | Egan | 428/41.4 |
| 4,564,406 | A | * | 1/1986 | Binks | 156/63 |
| 4,629,441 | A | * | 12/1986 | Cahill | 446/372 |
| 4,655,868 | A | * | 4/1987 | Hefele | 156/238 |
| 4,687,527 | A | * | 8/1987 | Higashiguchi | 156/72 |
| 4,776,916 | A | * | 10/1988 | Prunesti et al. | 156/291 |
| 4,838,965 | A | * | 6/1989 | Bussard | 156/83 |
| 5,133,819 | A | * | 7/1992 | Croner | 156/230 |
| 5,234,521 | A | | 8/1993 | De Picardie | |
| 5,244,524 | A | * | 9/1993 | Yamane | 156/230 |
| 5,407,729 | A | * | 4/1995 | Verden et al. | 428/196 |
| 5,489,359 | A | * | 2/1996 | Yamane | 156/540 |
| 5,631,064 | A | * | 5/1997 | Marecki | 428/143 |
| 6,224,707 | B1 | * | 5/2001 | Lion | 156/230 |
| 6,425,324 | B1 | * | 7/2002 | Yamamoto | 101/34 |
| 6,635,604 | B1 | * | 10/2003 | Halliday et al. | 507/136 |
| 6,793,999 | B2 | * | 9/2004 | Wittmeyer, Jr. | 428/40.1 |
| 7,182,828 | B2 | * | 2/2007 | Zirker | 156/230 |
| 7,364,783 | B2 | | 4/2008 | Nordstrom | |
| 2004/0176005 | A1 | | 9/2004 | Nordstrom | |
| 2007/0235125 | A1 | | 10/2007 | Doeling | |

OTHER PUBLICATIONS

English translation of JP2011-068130A, Apr. 7, 2011.*

* cited by examiner

METHOD FOR BONDING SUPPLEMENTAL MATERIAL TO TEXTILES

FIELD

The present application relates to the design and manufacture of garments and other apparel, and particularly to methods for bonding supplemental materials onto textiles, including textiles used for garments and other apparel.

BACKGROUND

During the manufacture of garments and other products, including hats, shoes, gloves, bags, and other accessories, a supplemental material having a particular shape may need to be secured to a base textile. The supplemental material may be provided for decoration, identification, reinforcement, or other purposes. For example, when manufacturing athletic uniforms, pockets or zippers may be attached to a base fabric layer of a jersey.

Attachment of supplemental material to a garment or related product may occur in any of numerous ways. For example, the supplemental material may be stitched onto a base layer of fabric. Alternatively, an adhesive may be used to bond the supplemental material to the fabric. Adhesives, such as thermoplastic films, are often the preferred method of securing supplemental material to a garment for numerous reasons. First, bonding helps maintain water-proof features of a seam-taped garment. Bonding can also reduce the weight of a garment by allowing for the removal of extraneous seam tape. A bonded seam may also be useful toward flattening or reducing the profile of a seam line that would otherwise be felt next to the skin of the wearer of the garment. Furthermore, bonding may be used to achieve a particular aesthetic on a garment.

A typical method for securing supplemental material to a garment includes die-cutting a sheet of adhesive material in the form of a thermoplastic film. The sheet of thermoplastic film is cut to match the shape of the supplemental material to be secured to a base fabric. Once the thermoplastic film is cut to the desired shape, it is secured to the base fabric using a heat treatment or other bonding process. The supplemental shape is then placed on the exposed side of the thermoplastic film and the adhesive material is again exposed to the bonding process, thus securing the supplemental shape to the base fabric. An example of such a process is disclosed in U.S. Patent Publication No. 2004/0176005.

While the foregoing process for bonding a supplemental material to a base fabric has certain efficiencies over other processes, it may also result in a significant amount of waste. In particular, if the shape of the die-cut piece of thermoplastic film is irregular or has a closed perimeter such that a hollow area is formed within the shape, a large amount of scrap material may result from the die-cutting process. It is not uncommon for this waste to exceed fifty percent of the adhesive sheet. Furthermore, the die-cutting process for the thermoplastic film results in significant handling costs during the manufacturing process.

In view of the foregoing, it would be desirable to provide a process for bonding a supplemental material to a base fabric that results in reduced waste. It would also be advantageous if the process for bonding supplemental material to a base textile could reduce manufacturing costs.

SUMMARY

A method is disclosed for bonding supplemental materials of various shapes to textiles. The method involves printing an adhesive material, such as a thermoplastic ink, onto a backing sheet, such as a paper backing. The thermoplastic ink may be printed onto the backing sheet using a print head, silk screen, gravure, or any other appropriate printing device capable of printing the ink onto the backing sheet in a desired shape and with a desired thickness. The adhesive material is generally printed in substantially the same shape as the perimeter of the supplemental material to be bonded to the base textile. After the thermoplastic ink is printed onto the backing sheet, the thermoplastic ink is transferred to the base fabric using a bonding process. The backing sheet is then peeled away, and the perimeter of the supplemental material is aligned with the adhesive material on the base textile. The supplemental material is then bonded to the exposed adhesive material on the base fabric using a subsequent bonding process.

The above described features and advantages, as well as others, will become more readily apparent to those of ordinary skill in the art by reference to the following detailed description and accompanying drawings. While it would be desirable to provide customizable athletic apparel that provides one or more of these or other advantageous features as may be apparent to those reviewing this disclosure, the teachings disclosed herein extend to those embodiments which fall within the scope of the appended claims, regardless of whether they include or accomplish one or more of the advantages or features mentioned herein.

DESCRIPTION

Figure 1:
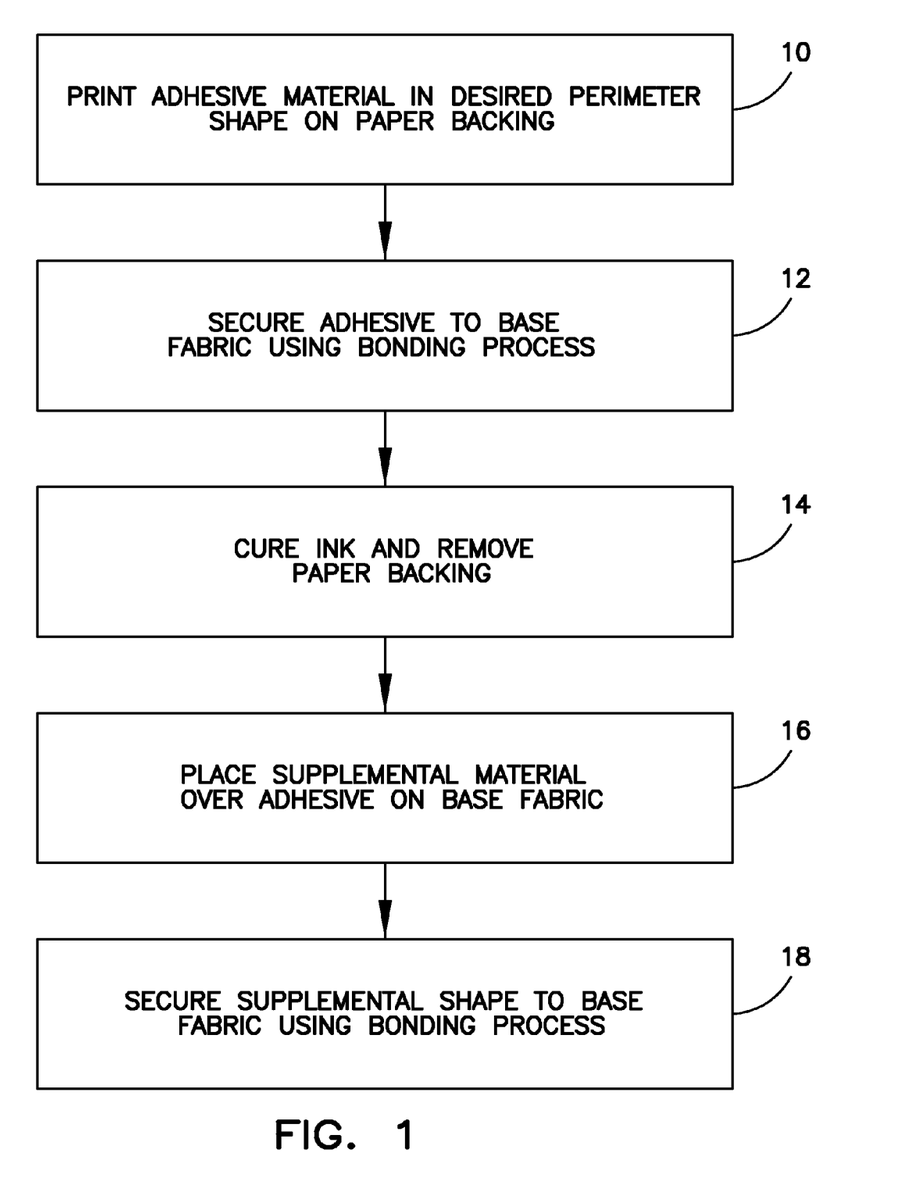
FIG. 1 shows a flowchart of a process for securing a supplemental material onto a textile.
Figure 2:
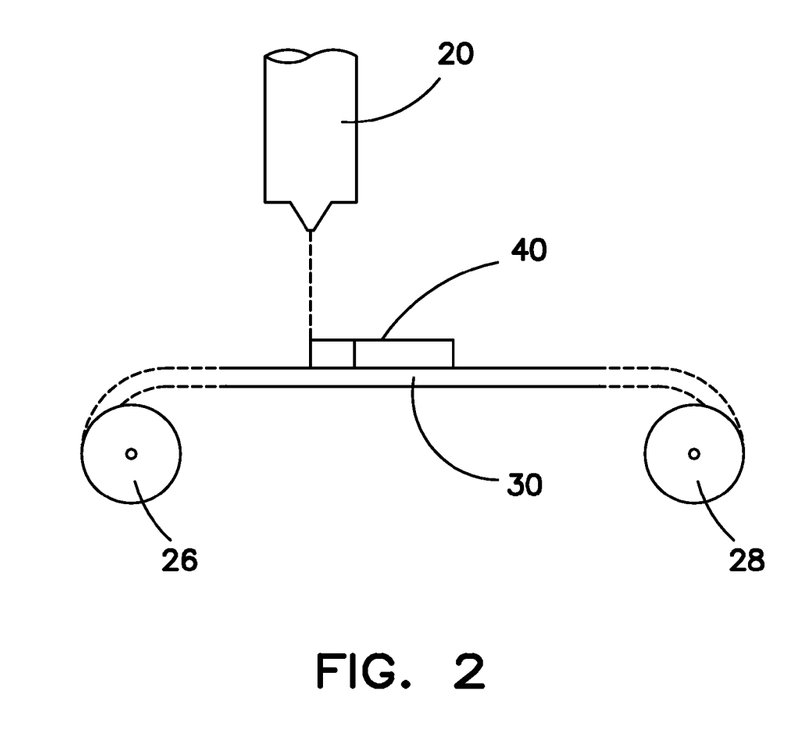
FIG. 2 shows a diagrammatic view of a printer used to print thermoplastic ink on a paper backing sheet according to the method of FIG. 1.

With general reference to FIG. 1, a method is shown for bonding supplemental materials of various shapes to textiles. As noted by box 10 of FIG. 1, and as shown in related FIGS. 2 and 3, the method involves first printing an adhesive material 40, such as a thermoplastic ink, onto a backing sheet 30, such as a paper backing. The thermoplastic ink 40 may be printed onto the paper backing 30 using a print head 20 or any other appropriate printing device capable of printing the ink 40 onto the paper backing 30 in a desired shape and with a desired thickness. In FIG. 2, the print head 20 is moved relative to the paper backing 30 to form the thermoplastic ink 40 in the desired shape on the paper backing 30.

In at least one embodiment, the paper backing 30 may be provided in roll form, such that the print head 20 receives portions of blank paper from a feeder roll 26 and delivers printed portions of paper to a destination roll 28. The roll form of the paper backing 30 allows for repeated printing of the thermoplastic ink in the desired shape over a length of paper. The continuous form of the paper allows the shapes to be printed relatively close together. Furthermore, because the paper is provided in roll form, the shapes of adhesive material may be easily handled during manufacturing by machines as well as humans.

Figure 3:
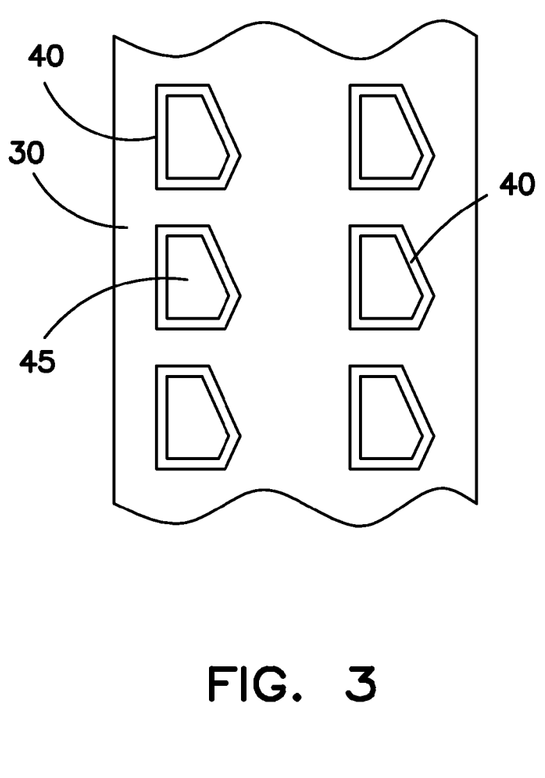
FIG. 3 shows a top view of the paper backing sheet of FIG. 2 with a plurality of shapes printed on the paper backing with the thermoplastic ink.

In the exemplary embodiment of FIG. 3, the adhesive material in the form of thermoplastic ink 40 has been printed in the shape of a plurality of substantially trapezoidal perimeters on the paper backing 30. While the adhesive material 40 has been disclosed herein as a thermoplastic ink, in alternative embodiments the ink could be comprised of a different material, such as a UV-reactive ink, an emulsion containing thermoplastics, or other appropriate material for the selected bonding process. Furthermore, while the backing sheet 30 has been described as a paper backing 30, in other embodiments, the backing sheet could be comprised of other materials, such as a polymer material, Mylar®, silicone coated paper, or any other appropriate backing material, depending on the type of adhesive material used in the process.

The adhesive material 40 is generally printed on the backing sheet 30 in a shape that substantially matches the perimeter of a second layer 60 of fabric or other material to be added to a base layer 50 of fabric. This shape is typically a closed perimeter shape, but in alternative embodiments could be an open perimeter (i.e., not a closed shape). Because the adhesive material is printed only in a perimeter shape in these embodiments, open areas 45 with no adhesive material 40 are formed in an interior portion of the printed shapes. These open areas 45 expose the backing material 30 within the printed shape, and generally extend over a greater area than the area covered by the adhesive material along the perimeter of the shape. In other words, the open area 45 within any given shape is generally more than the area covered by the adhesive along the perimeter of the shape. However, in some alternative embodiments, the area covered by the adhesive material could actually be greater than the open area in the interior of the shape. In any event, using adhesive material along the perimeter of the shape with substantial open areas 45 is advantageous because the adhesive material tends to be expensive. Therefore, because substantial open areas 45 are formed in the printed shape, significant savings are realized over processes that involve printing the entire shape with adhesive material, including the interior portion of the shape.

With the adhesive material 40 printed on the backing sheet 30 in a given shape, the backing sheet may then be cut to provide one or more of the printed shapes on a single piece of backing material. These pieces of backing material 30 are then used to transfer the thermoplastic ink in the given shape to another location.

As noted in box 12 of the embodiment of FIG. 1, after the thermoplastic ink 40 is printed onto the paper backing 30, the thermoplastic ink is transferred to the base fabric 50 using a bonding process. The bonding process may be any of various known bonding processes, such as thermal bonding, high frequency welding, or any of various other bonding processes. The base fabric 50 may be provided as part of a garment, shoes, bags, athletic accessory, or any of various other items. The term "apparel" as used herein refers generally to coverings and related accessories, including, for example, garments, shoes, gloves, hats and bags.

Figure 4:
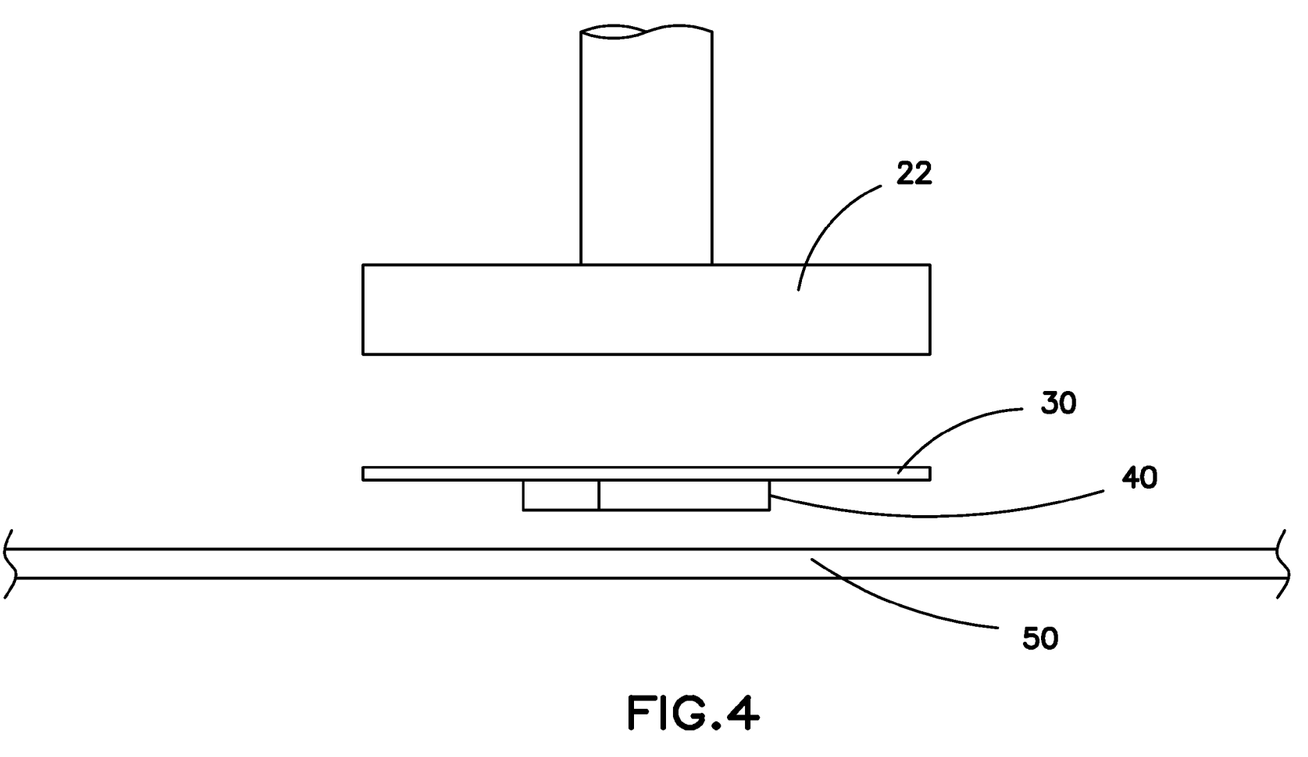
FIG. 4 shows a heat platen used to bond the thermoplastic ink onto a base fabric according to the method of FIG. 1.

FIG. 4 shows an exemplary embodiment of a thermal bonding operation where the adhesive material 40 is thermoplastic ink. FIG. 4 shows the base fabric 50 of a garment with the thermoplastic ink 40 facing the base fabric 50. In the embodiment of FIG. 4, a heated platen 22 is moved into contact with the paper backing 30, thus forcing the thermoplastic ink 40 against the base fabric 50. The heat and pressure from the platen 22 causes the thermoplastic ink to bond with the base fabric 50.

Figure 5:
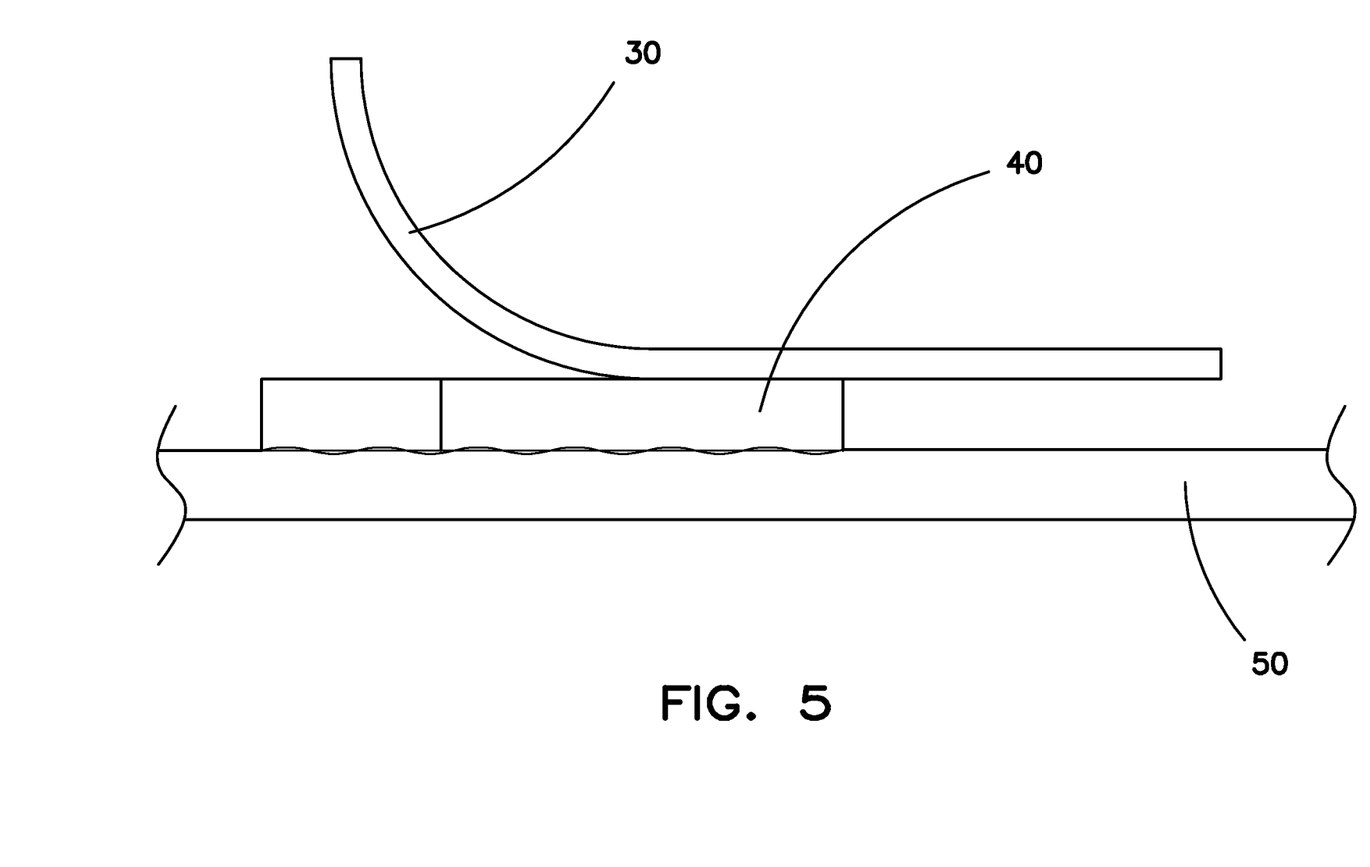
FIG. 5 shows the paper backing being peeled away from the thermoplastic ink according to the method of FIG. 1.

Once the thermoplastic ink 40 is heated by the platen, it is allowed to cure, as noted by box 14 of FIG. 1. Then, the paper backing 30 is peeled away from the thermoplastic ink 40, as shown in FIG. 5. After the paper packing 30 is peeled away from the thermoplastic ink 40, the thermoplastic ink 40 is exposed on the surface of the base fabric 50.

Figure 6:
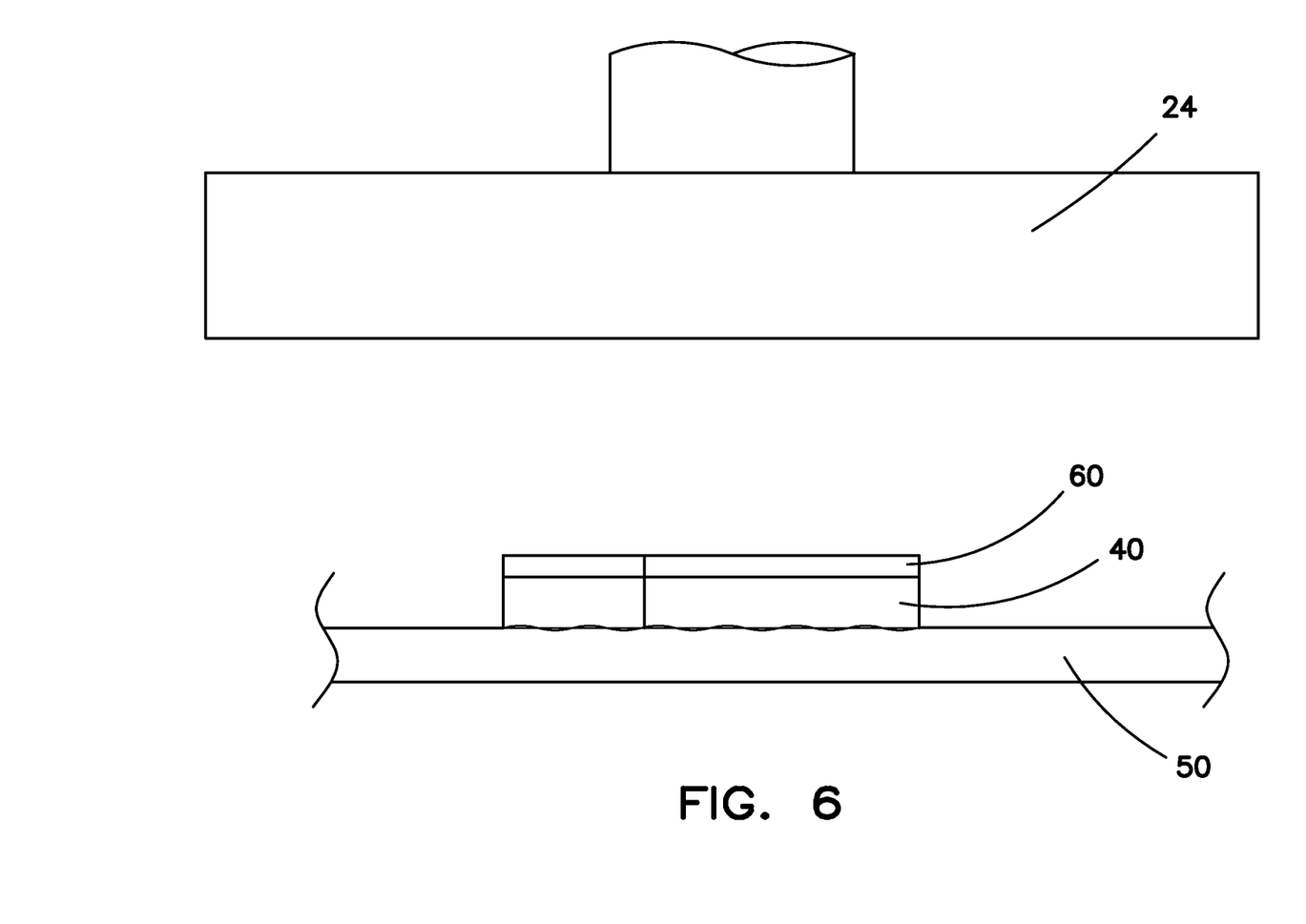
FIG. 6 shows a supplemental material being bonded to the base fabric and thermoplastic ink of FIG. 5 using a heat platen.

Next, as noted in box 16 of FIG. 1 and in the diagram of FIG. 6, a supplemental material 60 is placed over the thermoplastic ink on the base fabric. The supplemental material 60 may be a fabric or other material which provides a functional or decorative element to the base material 50. For example, the supplemental material may be designed to provide a pocket, zipper, design or any number of other features to the base material. The supplemental material 60 is generally disclosed herein as an overlay on the base material, but may also comprise an under or interior portion on the base material. The supplemental material 60 has generally the same perimeter shape as the thermoplastic ink 40 bonded to the base fabric 50. Accordingly, the supplemental material 60 is aligned with the thermoplastic ink 40 when the supplemental material 60 is placed on the base fabric.

As noted in box 18 of FIG. 1, after the supplemental material is placed over the thermoplastic ink, a heated platen 24 is moved into contact with the supplemental material 60. The heat and pressure from the platen 24 causes the thermoplastic ink to bond to the supplemental material, thus securing the supplemental material 60 on the base fabric 50. Of course, it will be recognized that in other embodiments any of various different bonding processes may be used to secure the supplemental material 60 to the base fabric with the adhesive material 40. For example, an ultrasonic or other welding process may be used to cause the adhesive material 40 to bond to the supplemental layer 60.

Figure 7:
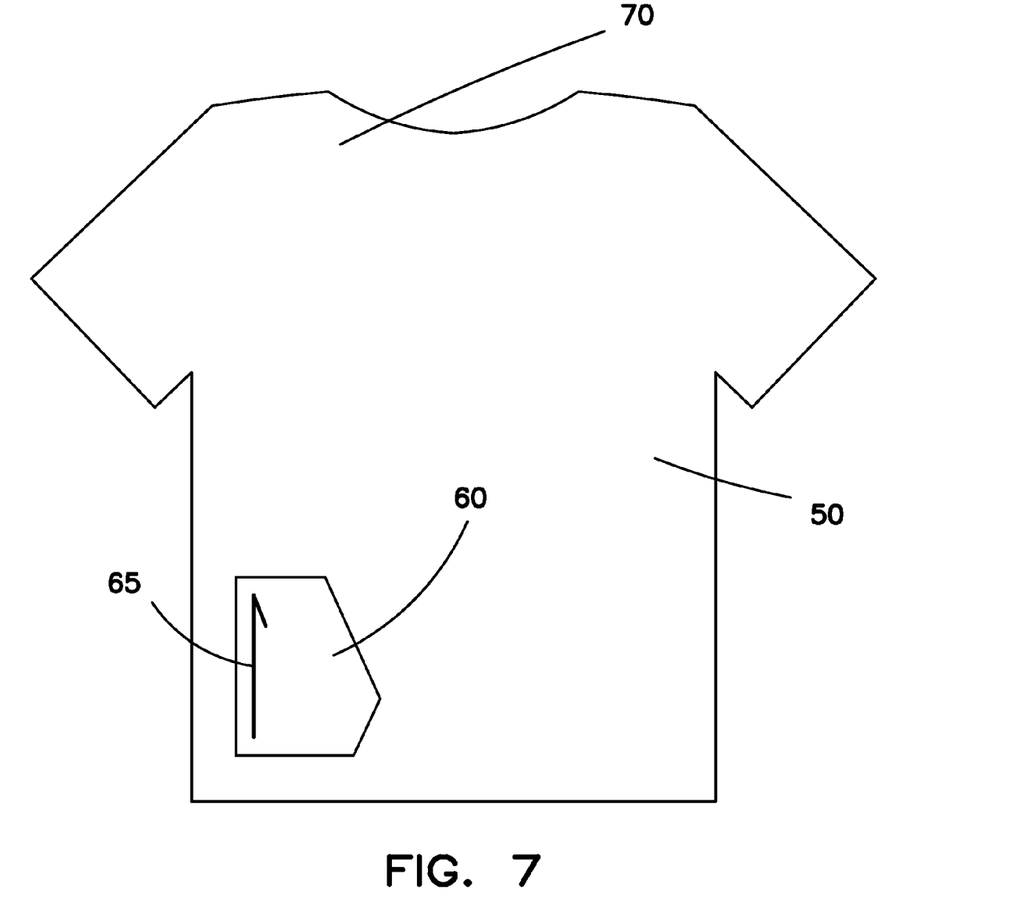
FIG. 7 shows a garment with the supplemental material of FIG. 6 bonded to the garment.

FIG. 7 shows a representation of a garment where the supplemental material 60 has been placed on a base material 50 that forms part of a shirt 70. The supplemental layer 60 has a trapezoidal shape and includes an opening 65. Because the supplemental layer 60 has been bonded to the base layer 50 only along the perimeter, the supplemental layer 60 forms a pocket on the shirt 70 with the opening 65 providing an entry to the pocket. In various embodiments, the opening 65 may be closeable, such as with a zipper or buttons, or may remain open at all times.

Figure 8:
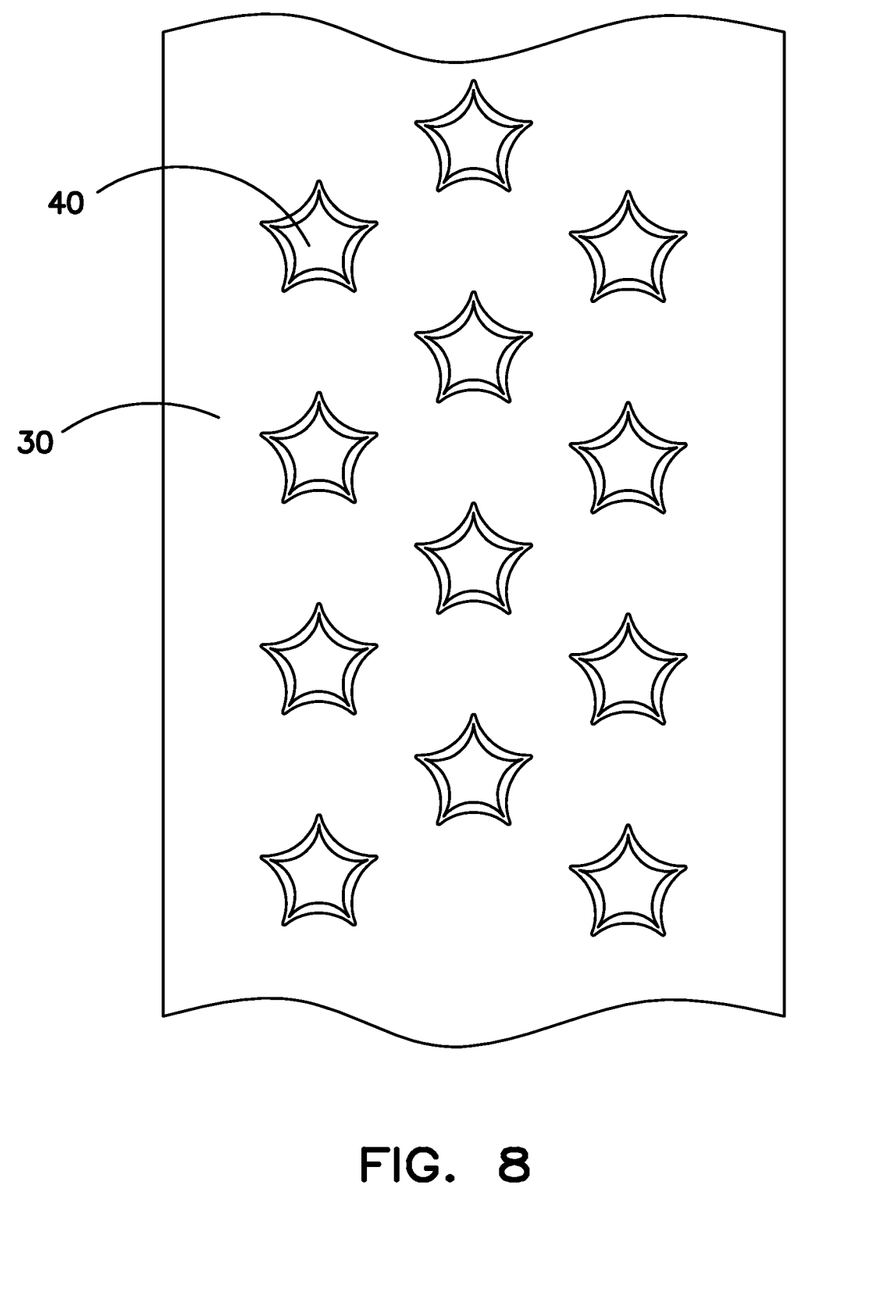
FIG. 8 shows an alternative embodiment of the paper backing sheet of FIG. 3 where the thermoplastic ink is provided in the decorative shape of a star.

While FIG. 7 shows that the base material 50 has been used to provide a shirt, it will be recognized that the base material 50 may be used to form any of various other garments, accessories, or other items of apparel, including pants, hats, shoes, socks, armbands, jackets, bags, or backpacks. Accordingly, the word "item of apparel" as used herein is intended to cover any such garment or accessory, including those mentioned in the foregoing sentence and equivalents thereof. Furthermore, it will be recognized that the supplemental layer provided on base material may take any of numerous forms and serve any of a number of purposes, including functional and decorative purposes. For example, FIG. 8 shows adhesive material 40 on a paper backing 30, where the adhesive material 40 is formed in the shape of a star, the adhesive material for use in association with bonding similar star shaped layers of fabric to a base fabric. Additionally, it will be recognized that the supplemental material may be bonded to the base layer before or after the base layer is formed as a garment or other item of apparel.

The process described above provides a method of bonding shaped materials onto a base fabric that reduces the amount of waste compared to past methods. Specifically, the process described herein greatly reduces the amount of thermoplastic waste or other adhesive material when compared to traditional die-cutting methods. Furthermore, because the thermoplastic ink takes on the desired shape immediately upon printing, handling of the adhesive material during the manufacturing process is significantly reduced, as the die-cutting step is eliminated. This significantly reduces the time and cost associated with manufacturing the related product. Furthermore, if the thermoplastic ink is delivered to a paper backing provided in roll form, the handling of the adhesive material may be even easier and additional efficiencies may be achieved.

While FIG. 1 has been described in association with FIGS. 1-8 to describe at least one embodiment of the method for bonding supplemental materials to textiles, it will be recognized that other embodiments are contemplated. For example, in one alternative embodiment, the adhesive material 40 is removed from the paper backing 30 before the adhesive material is secured to the base fabric 50. Thus, in this embodiment, step 14 of FIG. 1 occurs prior to step 12 of FIG. 1. After the adhesive material 40 (in solid form) is peeled from the paper backing 30, the adhesive material 40 is placed on the base fabric. The adhesive material 40 may then be bonded to the base fabric 50 either before or after the supplemental layer 60 is placed in contact with the adhesive material 40. If the bonding occurs after the supplemental layer 60 is placed in contact with the adhesive material, bonding of the adhesive material to the base fabric 50 and the supplemental layer may occur simultaneously.

In yet another example of an alternative embodiment of the method for bonding supplemental materials to textiles, the adhesive material 40 is printed directly on the base fabric 50 or the supplemental layer 60 and not on a backing layer. This further simplifies the embodiment of FIG. 1 by removing the backing material from the process. In this embodiment, after the adhesive material is printed to either the base fabric 50 or the supplemental material 60, the two layers of base fabric and supplemental material 60 are brought into contact with each other and the adhesive material is bonded to the base fabric 50 and the supplemental material 60.

In an embodiment where the adhesive material is printed directly on the supplemental material 60, the supplemental layer 60 must be cut either before or after the adhesive material is printed on the supplemental layer. Accordingly, in at least one embodiment, the backing sheet 30 of FIG. 3 is substituted with a sheet of supplemental material 60. The adhesive material 40 is then printed in a predetermined shape on the sheet of supplemental material 60. The sheet of supplemental material 60 is then die cut to the predetermined shape, resulting in an overlay with adhesive material 40 provided along the perimeter portion of the overlay. These overlays are then placed on the base layer of fabric 50 and the adhesive material 40 is used to bond the overlay to the base layer 50.

Although the method for bonding supplemental materials to textiles has been described with respect to certain preferred embodiments, it will be appreciated by those of skill in the art that other implementations and adaptations are possible. For example, although the disclosed embodiment involves thermoplastic ink as the adhesive material that is heated and cured to form a bond, other types of inks are possible such as UV inks capable of forming bonds with fabrics. Thus, as used herein, the term "ink" generally refers to any substance configured for use in association with a printing device. Moreover, it will be recognized that there are advantages to individual advancements described herein that may be obtained without incorporating other aspects described above. Therefore, the spirit and scope of any eventual claims should not be limited to the description of the preferred embodiments contained herein.

What is claimed is:

1. A method of making an item of apparel including a first layer of material and a second layer of material, the method comprising:

printing an adhesive material as an ink layer in a shape that substantially matches a closed perimeter shape of the first layer of material, wherein no adhesive material is printed within the closed perimeter shape of the printed ink layer;

placing the printed ink layer on the first layer of material with the printed ink layer exposed on the first layer of material;

contacting the second layer of material with the exposed printed ink layer on the first layer of material; and bonding the second layer of material to the exposed printed ink layer on the first layer of material, wherein the ink layer is printed in the shape that substantially matches the closed perimeter shape of the first layer of material before the printed ink layer is placed on the first layer of material or contacted with the second layer of material.

2. The method of claim 1 wherein the second layer of material is a fabric base layer of the item of apparel and the first layer of material is a supplemental portion of the item of apparel.

3. The method of claim 1 wherein placing the printed ink layer on the first layer of material further comprises bonding the printed ink layer to the first layer of material.

4. A method of making an item of apparel including a first layer of material and a second layer of material, the method comprising:

printing a layer of adhesive material in a shape that substantially matches a closed perimeter shape of the first layer of material or the second layer of material, the closed perimeter shape substantially void of the adhesive material within the closed perimeter shape;

placing the printed adhesive material on the first layer of material with the printed adhesive material exposed on the first layer of material;

contacting the second layer of material with the exposed printed adhesive material on the first layer of material; and bonding the second layer of material to the exposed printed adhesive material on the first layer of material, wherein the adhesive material is printed in the shape that substantially matches the closed perimeter shape of the first layer of material or the second layer of material before the printed adhesive material is placed on the first layer of material or contacted with the second layer of material.

5. The method of claim 4 wherein the first layer of material is a fabric base layer of the item of apparel and the second layer of material is a supplemental portion of the item of apparel.

6. The method of claim 4 wherein the second layer of material is a fabric base layer of the item of apparel and the first layer of material is a supplemental portion of the item of apparel.

7. The method of claim 4 wherein placing the layer of printed adhesive material on the first layer of material further comprises bonding the layer of printed adhesive material to the first layer of material.

8. The method of claim 4 wherein the adhesive material is a thermoplastic ink or an emulsion containing thermoplastics.

* * * * *